Jan. 20, 1925. 1,523,569
F. W. WILSON
ARTIFICIAL DENTURE ELEMENT
Original Filed Feb. 27, 1922   2 Sheets-Sheet 1
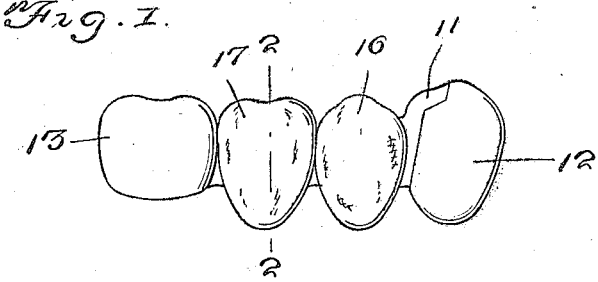
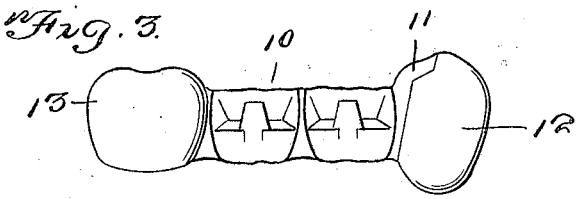
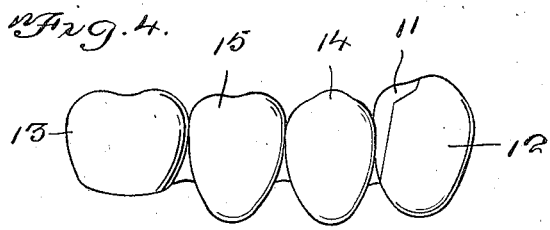
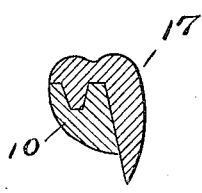
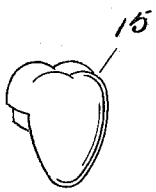
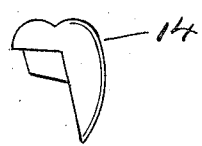

Jan. 20, 1925.　　　　　　　　　　　　　　　　　　　　　1,523,569
F. W. WILSON
ARTIFICIAL DENTURE ELEMENT
Original Filed Feb. 27, 1922　　2 Sheets-Sheet 2

F. W. Wilson
INVENTOR

BY Victor J. Evans
ATTORNEY

WITNESS:

Patented Jan. 20, 1925.

1,523,569

UNITED STATES PATENT OFFICE.

FREDERICK WILBUR WILSON, OF WILLITS, CALIFORNIA.

ARTIFICIAL DENTURE ELEMENT.

Application filed February 27, 1922, Serial No. 539,547. Renewed December 4, 1924.

*To all whom it may concern:*

Be it known that I, FREDERICK WILBUR WILSON, a citizen of the United States, residing at Willits, in the county of Mendocino and State of California, have invented new and useful Improvements in Artificial Denture Elements, of which the following is a specification.

This invention relates to improvements in artificial teeth and has for an object the provision of a new and improved method of constructing any kind of artificial prosthetic pieces, such as sets of teeth or bridge work, and of providing pink porcelain gum restorations, where the gums have receded, due to extraction, or other causes.

Heretofore in the construction of artificial dentures, artificial teeth now on the market were waxed in position on articulators and then before the soldering or casting operation could be performed, the artificial teeth or facings had to be reversely removed from the wax, or the waxed backings, without effecting the slightest distortion of the delicate wax matrix. If the artificial teeth were not removed before the soldering or casting was performed, the porcelain teeth or facings would be very likely to crack and chip due to rapid and great thermal changes. This operation is extremely trying, as a small particle of wax adhering to the porcelain will cause a fracture of the delicate wax, so that the work must be repeated until apparently successful. Then, after soldering or casting the restoration part of the prosthetic piece to the abutments, if a distortion or fracture results and is unnoticed in the removal of the facings or teeth from the wax model it will be visible in the finished gold piece, sometimes to the extent of ruining the whole prosthetic piece and thus cause loss of time and money to the dentist and inconvenience and loss of time to the patient.

Heretofore it has been practically impossible to be sure of a successful result in the construction of prosthetic pieces, due to the extreme difficulty experienced in pouring investment without having the bubbles distort the all important bases.

By the use of the present invention, it will not be necessary to subject the porcelain teeth to the usual excessive heat, so that danger of injury to the teeth is thus avoided.

In addition, the invention further aims to provide means for supplying pink porcelain gum restorations at a nominal cost and thus place work of this character within reach of persons of relatively small means.

With the above and other objects in view, the invention further includes the following novel features and details of construction, to be hereinafter more fully described, illustrated in the accompanying drawings and pointed out in the appended claim.

In the drawings:—

Figure 1 is an elevation illustrating the formation of a bridge for replacing a molar and a bicuspid tooth, the view showing temporary teeth or cores in position.

Figure 2 is a section on the line 2—2 of Figure 1.

Figure 3 is a view similar to Figure 1 with the temporary teeth or cores removed.

Figure 4 is a view similar to Figure 1 showing the permanent or porcelain teeth in position.

Figure 5 is a detail view of a temporary molar tooth or core.

Figure 6 is a similar view of a porcelain molar.

Figure 7:
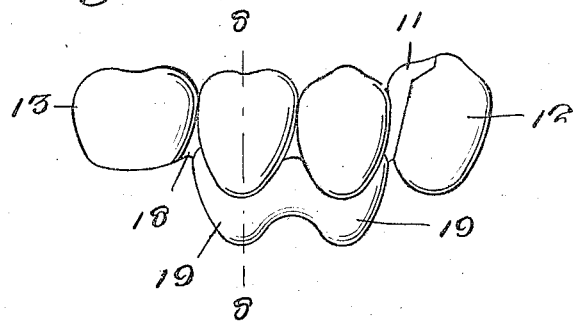
Figure 7 is an elevation similar to Figure 4, but illustrating a porcelain gum restoration.

Referring in detail to the drawings, wherein like characters of reference denote corresponding parts, the reference character 10 indicates a metal bridge, which is made in the usual manner and is shown as supported at one end by an abutment 11 which engages a tooth 12, and at its other end with a gold crown abutment 13. These abutment teeth are formed in the usual manner and the bridge 10 is molded in the ordinary mold of impression material made to conform to the mouth of the patient. Instead of using the porcelain teeth, which, in the present instance include a bicuspid 14 and a molar 15, the present invention contemplates the use of temporary teeth or cores 16 and 17, which respectively occupy the spaces designed to be permanently occupied by the teeth 14 and 15. The purpose of this is to prevent injury to the permanent teeth 14 and 15, due to excessive heat in molding the bridge. The cores 16 and 17 of course have the same size and shape as the teeth 14 and 15, respectively.

The temporary teeth or cores 16 and 17, are made from a cheap material and one which will easily disintegrate under certain conditions, but which will successfully resist excessive heat. For this purpose, the teeth are made from investment material, which is a material similar to fire-clay, graphite, pumice, silica and the like mixed in various proportions with a suitable vehicle and which, when mixed with water and allowed to set, becomes a hard stonelike substance and may be subjected to intense heat without shrinkage or expansion, or in any way becoming distorted from its original shape. It will, however, after intense heat is applied, be readily disintegrated by water, chemicals or other important means.

It will thus be apparent that after the bridge has been properly cast to the temporary teeth or cores, the latter may be removed by disintegration, whereupon, the porcelain teeth may be cemented in place.

Figure 8:
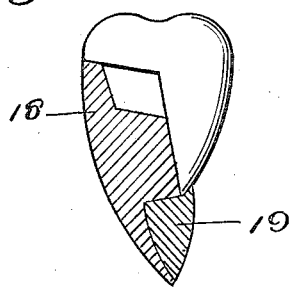
Figure 8 is an enlarged section on the line 8—8 of Figure 7.
Figure 9:
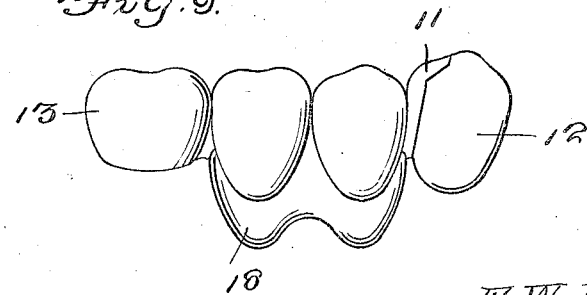
Figure 9 is an elevation similar to Figure 7, before the porcelain gum restoration is applied.

As a further use of the invention, there is illustrated in Figures 7, 8 and 9 a means by which pink porcelain gum restorations may be cheaply and efficiently made. Pink porcelain gum restorations when supplied under the process heretofore used are extremely costly, due to the tedious and roundabout method used in constructing such dentures and the high cost of platinum. By the use of the present invention, a plate is made exactly like the ordinary vulcanite plate, except that the base is cast in a metal, such as gold. The anterior part is left open and the porcelain is baked about the temporary teeth or cores, whereupon the latter are removed by treatment with water or other mild chemical (which of course should be something which will not act upon or injure the metal base or the porcelain, and the porcelain teeth cemented in place. In Figures 7, 8 and 9, the gold base of the denture is indicated at 18, while the porcelain gum restoration is indicated at 19.

By the use of the temporary teeth or cores, the permanent or porcelain teeth may be interchangeable so as to render repair easy, if the teeth are broken, which, in contradistinction to the former method, does not necessitate reheating to a temperature of sixteen hundred degrees or more. Also there is no tedious soldering in making dentures with the present process, as no pins are in general necessary. Further these temporary teeth or cores may be manufactured at an exceedingly low cost, so that the cost of work of this character is materially reduced, there being no danger of injuring the expensive porcelain teeth during the process of manufacturing dentures.

The invention is susceptible of various changes in its form, proportions and minor details of construction and the right is herein reserved to make such changes as properly fall within the scope of the appended claim.

Having described the invention what is claimed is:—

Molded temporary artificial duplicates of denture elements having substantially the same exterior shape and size as finished artificial denture elements, such duplicates being composed of a material which when mixed with water and molded, is converted into a stone-hard article which can withstand being heated to the casting temperatures of metallic gold while being stable against distortion or disintegration and against substantial shrinkage and expansion, and which duplicates after such heating will be readily disintegrated by water and weak chemicals, toward which common metals and plastics used in permanent artificial denture elements are resistant and stable.

In testimony whereof I affix my signature.

FREDERICK WILBUR WILSON.